June 24, 1952     H. A. SPRY     2,601,233
DISINFECTING SEED POTATO CUTTER
Filed March 31, 1949
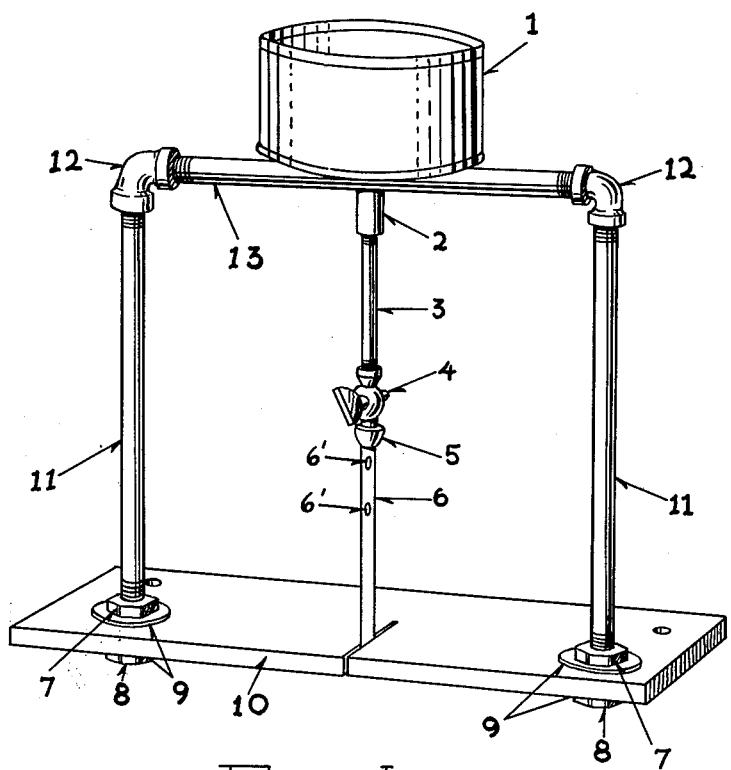
Fig. I.
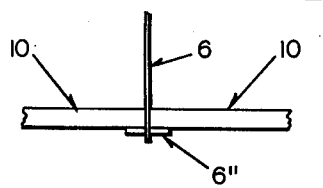
Fig. II.
INVENTOR
HIRAM A. SPRY
BY Beaman and Patch
ATTORNEYS Patented June 24, 1952

2,601,233

UNITED STATES PATENT OFFICE 2,601,233

DISINFECTING SEED POTATO CUTTER

Hiram A. Spry, Munith, Mich.

Application March 31, 1949, Serial No. 84,535

1 Claim. (Cl. 146—170)

This invention relates to seed potato cutters, and more particularly to the provision of a disinfected cutting blade for use in a seed potato cutter, the blade preferably being of very thin material and used under tension.

As is well known, potatoes are subject to a variety of diseases which cause losses in the potato crop from a small percentage thereof to practically complete failure at times. Many of these diseases, such as ring rot, may be spread by use of a common cutting knife to cut a number of potatoes. It is possible, for a very few infected potatoes in a large number of potatoes selected for seed, to spread a communicable disease throughout most of the seeds.

In order to prevent the spreading of communicable diseases among seed potatoes by the blade during cutting of the seed potatoes, I have provided a blade which can be continually disinfected during use, the disinfectant operation being performed by gravity and being performed continuously.

I have, likewise, provided a very thin blade mounted for cutting seed potatoes, the blade being supported under tension so that it may perform its cutting operation most efficiently, and without shedding the disinfectant fluid at an uneconomically high rate.

It is, therefore, an object of my invention to provide a seed potato cutter having a blade which is continuously disinfected during the seed potato cutting operation.

A further object of my invention is to provide a seed potato cutting blade which is mounted under tension in order to accomplish its cutting operation most economically.

A still further object is to provide a seed potato cutting blade and mounting structure, the cutting blade being subjected to a continuous disinfecting action, while mounted under tension to prevent the shaking off of the disinfectant fluid during the cutting operation.

Further objects and advantages of my invention will be found from a consideration of the following specification and appended claim in connection with the accompanying drawings, in which:

Fig. I is a view in perspective showing my seed potato cutting blade mounted in its supporting structure and in juxtaposition to a fluid tank, and Fig. II is a detail view showing the lower end of the cutting blade and the provision for mounting the same under tension.

In the drawings, I have shown my seed potato cutter as a single unit, and best adapted for hand cutting of seed potatoes. However, I anticipate that such a structure may be mounted in many of the mechanical seed potato cutting machines, and adapted for cutting seed potatoes on a conveyor or other similar structure. I, therefore, do not limit myself to the hand cutting model shown.

In the drawings, the fluid tank 1 is mounted on and positioned for supplying liquid into a coupling 2 which is attached to a nipple 3, in communication with an adjustable petcock 4. The petcock 4 controls the flow of liquid from the disinfecting fluid tank 1 to the pipe system. It may be preferred to have the petcock 4 mounted in the position of the coupling 2, which is as successful as having it in the arrangement shown.

Directly below the petcock 4 is mounted a flow control 5 which serves to spread the liquid onto the blade 6 secured in the lower end of the flow control 5. The blade 6 is formed with a number of apertures 6' which likewise spread the flow of the disinfecting liquid out over the entire width of the blade 6, and has mounted on its lower end a pin 6'' which extends transversely to the longitudinal axis of the blade 6, for a purpose as will appear later.

I have mounted the above structure on a base 10, the supporting structure comprising a pair of pipe uprights 11 to which are attached the elbows 12 which support the cross member 13. The vertical supporting members 11 are attached to the base 10 by the nuts 8 and are positioned vertically by the lock nuts 7, the entire juncture being protected by the washers 9.

As may be seen from the drawings, I am able to adjust the vertical height of the frame structure by means of the nut 7, thereby drawing the pin 6'' up against the underside of the base 10, which will impart tension to the blade 6.

In operation, the petcock 4 controls the amount of fluid which flows from the disinfecting fluid tank 1 down through the coupling 2, the extension nipple 3, and through the flow control 5 to the blade 6. The petcock 4 should be adjusted so that the disinfecting fluid from the fluid tank 1 flows at a high enough rate of speed that the cutting blade 6 is completely covered by the disinfecting fluid between cuts, the apertures 6' assisting in spreading the fluid. This will appear to be a very fast flow of liquid, but I have found that it is economical in the prevention of disease in potato crops.

Having described my invention, what I claim and desire to protect by Letters Patent is:

A combined seed potato cutter and disinfectant device comprising a base, a supporting frame, a vertically disposed fixed cutting blade tension mounted by the said base and frame in a position to cut a seed potato forced against the same, said blade being of thin and narrow construction, means associated with the upper end of said blade to provide a downwardly flowing stream of disinfecting fluid supplied to the upper end of said blade and allowed to flow down said blade toward its lower end, said blade having a transverse hole of substantial diameter as compared with the width of said blade and being located within the vertical edges of said blade, said hole being located below that portion of said blade initially flooded by the disinfecting fluid and across which said fluid flows to diffuse the flow with respect to the blade surface whereby said fluid may economically and completely flood the opposite sides of said blade.

HIRAM A. SPRY.

REFERENCES CITED

The following references are of record in the file of this patent:

UNITED STATES PATENTS

| Number | Name | Date |
|---|---|---|
| 286,706 | Kay | Oct. 16, 1883 |
| 1,909,672 | Hamersley | May 16, 1933 |
| 2,101,002 | Fincke | Nov. 30, 1937 |
| 2,152,183 | Fetterolf | Mar. 28, 1939 |
| 2,226,071 | Oldenburg | Dec. 24, 1940 |
| 2,420,776 | Hanna | May 20, 1947 |